United States Patent [19]

Luthra

[11] Patent Number: 4,921,822
[45] Date of Patent: May 1, 1990

[54] CERAMIC COMPOSITE

[75] Inventor: Krishan L. Luthra, Schenectady, N.Y.

[73] Assignee: General Electric Company, Schenectady, N.Y.

[21] Appl. No.: 267,879

[22] Filed: Nov. 7, 1988

[51] Int. Cl.$^5$ .................... C04B 35/02; C04B 35/08
[52] U.S. Cl. ........................... 501/95; 501/103; 427/217; 427/205; 427/196; 427/427; 428/376; 428/404
[58] Field of Search ............. 501/95, 80, 84, 72, 501/152; 427/217, 205, 196, 427, 212; 428/376, 404

[56] References Cited

U.S. PATENT DOCUMENTS

| | | |
|---|---|---|
| 3,869,335 | 3/1975 | Siefert .................. 428/294 |
| 4,282,922 | 8/1981 | Hartmann .............. 427/404 |
| 4,341,823 | 7/1982 | Sexton et al. .......... 427/404 |
| 4,434,211 | 2/1984 | Shoher et al. .......... 427/205 |
| 4,642,271 | 2/1987 | Rice ........................ 501/95 |
| 4,713,300 | 12/1987 | Sowman et al. ........ 427/217 |
| 4,732,877 | 3/1988 | Olson et al. ............ 501/95 |
| 4,738,896 | 4/1988 | Stevens .................. 427/404 |
| 4,766,013 | 8/1988 | Warren ................ 427/255.2 |
| 4,789,563 | 12/1988 | Stevens ................ 427/397.1 |
| 4,810,530 | 3/1989 | D'Angelo et al. ..... 427/249 |

Primary Examiner—William R. Dixon, Jr.
Assistant Examiner—Sue Hollenbeck
Attorney, Agent, or Firm—Jane M. Binkowski; James C. Davis, Jr.; James Magee, Jr.

[57] ABSTRACT

A composite is produced comprised of ceramic oxide fibrous material which is coated with a noble metal and disposed in a polycrystalline ceramic oxide matrix.

14 Claims, 1 Drawing Sheet

CERAMIC COMPOSITE

The invention herein described was made in the course of or under a contract or subcontract thereunder (or grant) with the Department of the Air Force.

This invention is directed to the production of a composite comprised of ceramic oxide matrix containing metallic coated ceramic oxide fibrous material.

Ceramic materials are gaining considerable attention these days because of their lower density and potentially higher use temperatures than metals. One of the major problems in using ceramics for structural applications is their poor toughness. They are brittle materials and generally fail in a brittle manner. It is believed that this problem can be alleviated by using ceramics as fiber-reinforced composites rather than as monolithics.

At high temperatures, oxidation is on e of the major problems in using non-oxide materials. Therefore, an ideal ceramic composite would be one that has all its components made of oxides.

At high temperatures of interest to ceramic composites, generally above about 1100° C and higher, it has been necessary to have matrices that are chemically compatible with the fiber. Otherwise, the chemical reactions at the fiber/matrix interface would degrade the mechanical properties of the composite. The use of even chemically compatible oxides as matrices presents one problem: clamping/bonding at the fiber/matrix interface. This problem is substantially overcome by the present ceramic composites which, in one embodiment, uses oxide matrices that are chemically compatible with the ceramic oxide fibrous material and uses a metallic coating to prevent clamping/bonding at the interface. By "chemically compatible" herein, it is meant that no significant chemical reaction occurs between the fiber and the matrix. Although the preferred mode of operation of the present invention is to have chemically compatible oxides for fibers and matrices, noncompatible oxides can also be used herein because the present metallic coating prevents significant chemical reaction between the fiber and the matrix.

Those skilled in the art will gain a further and better understanding of the present invention from the detailed description set forth below, considered in conjunction with the accompanying scanning electron micrographs which form a part of the specification wherein.

Figure 1B:
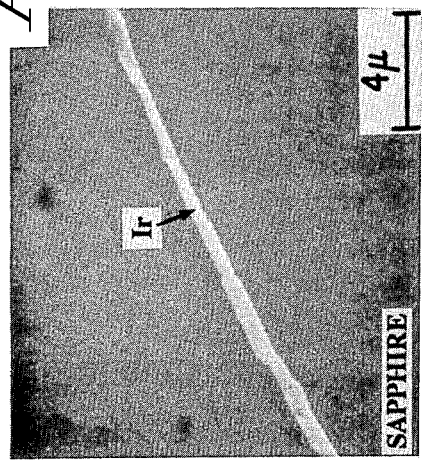
FIG. 1B shows a magnified portion of FIG. 1A.

Briefly stated, the present composite is comprised of coated ceramic oxide fibrous material and ceramic oxide matrix, said fibrous material and oxide matrix having a melting point or a softening point above about 1100° C, said fibrous material being coated with a noble metal selected from the group consisting of platinum, iridium, rhodium, ruthenium and any mixture or alloy thereof, said composite having a porosity of less than about 30% by volume of the composite, said coated fibrous material comprising at least about 10% by volume of the solid portion of said composite, said oxide matrix comprising at least about 30% by volume of the solid portion of said composite.

The composite can be produced by a number of methods which have no significant deleterious effect thereon. Each method of producing the composite includes providing the desired fibrous material and coating it with the noble metal. In each production method, any volatilization of the coating of noble metal should leave none, or no significant portion of, the fibrous material exposed; i.e., it should leave none, or no significant portion, of the fibrous material in direct contact with the matrix in the final composite.

The fibrous material is a ceramic oxide having a melting or softening point above 1100° C, preferably above 1500° C. The particular composition of the fibrous material depends largely on the composite to be produced. Representative of a useful fibrous material is alumina, mullite, zircon, yttrium oxide, beryllium oxide, yttria stabilized zirconia, calcia stabilized zirconia, and mixtures thereof. Preferably, the fibrous material is alumina ($Al_2O_3$).

As used herein, "fibrous material" includes fibers, filaments, continuous filaments, strands, bundles, whiskers, cloth, felt, and any combination thereof. The fibrous material can be amorphous, crystalline, or a mixture thereof. The crystalline fibrous material can be single crystal or polycrystalline.

The fibrous material is coated with a noble metal selected from the group consisting of platinum, iridium, rhodium, ruthenium, and any combination thereof. Preferably, the coating is comprised of platinum.

The coating of metal can be deposited by a number of conventional techniques which have no significant deleterious effect on the fibrous material. Representative of a suitable method for depositing the metal is sputtering, chemical vapor deposition, electroplating and electroless plating and any combination thereof.

The thickness of the metallic coating can vary depending largely on processing conditions and the particular composite desired and is determined empirically. The coating should be at least sufficiently thick to be continuous. Generally, it ranges in thickness from about 0.5 microns to about 5 microns, frequently from about 1 micron to less than about 4 microns, and preferably from about 1 micron to about 2 microns. Generally, a coating thicker than about 5 microns provides no additional advantage. The metallic coating should leave none, or no significant portion, of the fibrous material exposed.

The matrix-forming material is comprised of a ceramic oxide which has a melting or softening point above 1100° C, preferably above 1500° C. The particular composition of the matrix-forming ceramic oxide depends largely on the composition of the fibrous material and the composite to be produced. Representative of a useful matrix-forming oxide is alumina, calcium aluminate, mullite, zircon, yttrium oxide, beryllium oxide, yttria stabilized zirconia, calcia stabilized zirconia, and mixtures thereof.

In most methods for producing the composite, the coated fibrous material is contacted with matrix-forming ceramic oxide powder to form a desired combination, arrangement, mixture or compact therewith. The ceramic powder is a sinterable or densifiable powder which can range in size. Generally, it has an average particle size ranging from submicron to about 10 microns, frequently from about 1 micron to about 6 microns, and preferably from about 2 microns to about 4 microns. In these methods, the matrix-forming powder is sintered or densified in the solid state to produce the matrix in the final composite. There is no significant loss of the fibrous material or matrix-forming powder.

A first production method comprises contacting the coated fibrous material with matrix-forming ceramic oxide powder to form a compact therewith, and firing or sintering the compact in a gaseous atmosphere at a temperature which produces the composite. To increase the density of the sintered body, it can be hot isostatically pressed subsequently in a conventional manner.

In a second production method, the coated fibrous material is contacted with the matrix-forming powder to produce a combination, mixture or compact which is hot-pressed under a pressure and at a temperature which produces the composite.

In a third method, a combination, mixture or compact of the coated fibrous material and matrix-forming powder is placed within an envelope which is pressure-transmitting at sintering or densification temperature and hot isostatically pressed by a gaseous pressure and at a temperature which produces the final composite.

The coated fibrous material can be contacted or combined with the matrix-forming powder in a number of ways by a number of techniques depending largely on the particular structure desired in the final composite. For example, the coated fibrous material can be distributed throughout the final composite or only in a portion or portions thereof. Preferably, none of the coated fibrous material, or no significant portion thereof, in the final composite is exposed.

In carrying out methods where a compact is used, shaping of the combination or mixture of coated fibrous material and matrix-forming powder into a compact can be carried out by a number of techniques such as extrusion, injection molding, die pressing, isostatic pressing, slip casting, roll compaction or forming, or tape casting to produce the compact of desired shape. Any lubricants, binders or similar shaping aid materials used to aid shaping of the mixture should have no significant effect on the compact or the final composite. Such shaping-aid materials are preferably of the type which evaporate away on heating at relatively low temperatures, preferably below 400° C, leaving no significant residue. Preferably, after removal of the shaping-aid materials, the compact has a porosity of less than 60% to promote subsequent densification.

In the first aforementioned method where the compact is sintered in a gaseous atmosphere, sintering temperature and time are determined empirically depending largely on the particular material being sintered and the specific composite density desired. Generally, higher sintering temperatures require less sintering time. Generally, sintering temperature ranges from about 1200° C to about 2000° C, preferably from about 1300° C to about 1700° C. Generally, the sintering atmosphere is at about atmospheric pressure but, if desired, a partial vacuum may be used. The sintering atmosphere should have no significant deleterious effect on the resulting composite. Specifically, sintering is carried out in an atmosphere in which the metal coating does not volatilize sufficiently to expose the fibrous material, or to expose a significant portion thereof, at the particular sintering temperature used. A gaseous atmosphere comprised of nitrogen, an inert gas, for example, argon, or any combination thereof can be used throughout the entire sintering temperature range. However, at lower sintering temperatures where significant volatization of the metallic coating will not occur, determined empirically, generally ranging from about 1200° C to about 1300° C, the compact also can be sintered in air, oxygen or any combination thereof. The final composite is cooled, generally to room temperature, i.e., from about 20° C to about 30° C, in an atmosphere which has no significant deleterious effect thereon.

In carrying out the hot pressing method, a combination, mixture or compact of the matrix-forming powder and coated fibrous material is hot-pressed, i.e. densified, at a pressure and temperature and for a sufficient period of time to produce the present composite. Hot pressing can be carried out in a conventional manner. Generally, hot-pressing temperature ranges from about 1100° C to about 2000° C and applied pressure at such pressing temperature ranges from about 2000 psi to a maximum pressure which is limited by available pressing equipment. Thus, for solid graphite dies the upper limit is about 5000 psi and for graphite fiber-wound dies the upper limit is about 15,000 psi. The specific temperature and pressure used is determinable empirically and depends largely on the material being pressed and the specific dense product desired. Generally, the higher the applied pressure, the lower is the pressing temperature required. Frequently, hot-pressing or densification temperature ranges from about 1400° C to about 1600° C and the pressure ranges from about 3000 psi to about 10,000 psi. It is advantageous to use a pressure close to the maximum available because the application of such high pressure makes it possible to keep the pressing temperature low enough to control grain growth. Hot-pressing is carried out under a gas which has no significant deleterious effect such as nitrogen, argon and mixtures thereof. Hot-pressing is carried out at the desired temperature in a period of time determined empirically generally ranging up to about 30 minutes.

Hot isostatic pressing can be carried out in a conventional manner. The composite-forming material is placed within an envelope of a suitable casing material, such as a glass, which is then evacuated and sealed. The resulting sealed structure is then compressed in a pressurized gaseous atmosphere under a pressure determined empirically, generally from about 5000 psi to about 15,000 psi, at a temperature generally ranging from about 1100° C to about 2000° C, frequently from about 1400° C to about 1600° C, to produce the composite. Representative of a gas suitable for providing the pressurized gaseous atmosphere is argon, nitrogen, helium and mixtures thereof.

In another embodiment, the present composite can be produced by a chemical vapor infiltration method. In such method, a compact or preform of the fibrous material is formed having a shape and open porosity determined largely by the composite to be produced, and the preform is infiltrated with the vapor of the matrix-forming ceramic oxide to form the matrix in situ. The preform has an open porosity of at least about 30% by volume which is distributed therein.

The present composite is comprised of ceramic matrix and metallic coated fibrous material. The matrix and fibrous material are comprised of ceramic oxide having a melting or softening point higher than 1100° C, preferably higher than 1500° C. The coating of noble metal bars contact, or bars significant contact, between the matrix and fibrous material. In the present composite, there is no reaction product, or no significant amount of reaction product, formed directly between the ceramic matrix and the fibrous material. Preferably, there is no reaction product formed directly between the ceramic matrix and the fibrous material which is detectable by scanning electron microscopy. Also, there is no significant reaction between the metallic coating and the matrix or fibrous material. Generally, none of the coated fibrous material in the composite, or no significant portion thereof, is exposed.

In the present composite, the ceramic matrix is continuous and interconnecting. It is distributed in the coated fibrous material, and generally it is space filling or substantially completely space filling. Generally, the matrix is in direct contact with more than 70% of the surface area of the coated fibrous material. Frequently, the ceramic matrix coats or envelops each coated fiber, filament, strand, bundle or whisker of the coated fibrous material sufficiently to be in direct contact with more than 80%, preferably more than 90%, more preferably more than 99%, of the surface area of the coated fibrous material in the composite.

The ceramic matrix is present in the composite in an amount of at least about 30% by volume of the solid portion of the composite. The matrix can be amorphous, crystalline or a combination thereof. Preferably, the ceramic matrix is polycrystalline and has an average grain size of less than about 100 microns, or less than about 50 microns, or less than about 20 microns, and most preferably less than about 10 microns.

The coated fibrous material comprises at least about 10% by volume of the solid portion of the composite. Generally, the coated fibrous material, ranges from about 10% or greater than about 10% by volume to about 70% by volume, frequently from about 20% by volume to about 60% by volume, or from about 30% by volume to about 50% by volume, of the solid portion of the composite.

The coating of noble metal on the fibrous material in the composite is detectable by scanning electron microscopy and generally ranges in thickness from about 0.5 microns to about 5 microns, frequently from about 1 micron to less than about 4 microns, or from about 1 micron to about 2 microns.

The coating of noble metal generally optimizes interfacial shear stress between the fibrous material and ceramic matrix resulting in a composite with a toughness significantly higher than that of a composite wherein the fibrous material is uncoated.

In one embodiment of the composite, the coated fibrous material is distributed only in a portion of the matrix.

In another embodiment, the coated fibrous material is distributed throughout the matrix.

In another embodiment, the present composite is comprised of a plurality of layers of coated fibrous material in the ceramic matrix wherein the coated fibrous layers preferably are substantially parallel to each other and separated from each other by ceramic matrix. Preferably, the ceramic matrix is distributed in each layer of coated fibrous material generally significantly or substantially uniformly.

In another embodiment, the composite contains a plurality of layers of coated filaments, there is no contact between the layers and they are separated by ceramic matrix. Preferably, each coated filament has a diameter of at least about 50 microns. Preferably in each layer, more than 99% by volume of the coated filaments, and preferably all or substantially all of the coated filaments, are spaced from each other and parallel or at least substantially parallel, to each other. Preferably, more than 99% by volume or substantially all of the coated filaments in each layer are aligned, or substantially aligned, in a single plane. Any misalignment of the coated filaments should not significantly degrade the mechanical properties of the composite. Also, preferably more than 99% or substantially all of the surface area of the coated filaments is in direct contact with the ceramic matrix.

One particular advantage of this invention is that the present composite is useful under oxidizing conditions.

The present composite is a solid and has a porosity of less than about 30%, or less than about 10%, preferably less than about 5%, more preferably less than about 1%, by volume of the composite. Most preferably, the composite is void- or pore-free, or has no significant porosity, or has no porosity detectable by scanning electron microscopy. Generally, any voids or pores in the composite are less than about 70 microns, preferably less than about 50 microns or less than about 10 microns, and generally they are distributed in the composite, and are preferably not connected.

The present composite has a wide range of applications depending largely on its particular composition. For example, it is useful as a wear resistant part or high-temperature structural component.

The invention is further illustrated by the following examples where, unless otherwise stated, the procedure was as follows:

EXAMPLE 1

Continuous sapphire (single crystal aluminum oxide) filaments, each having a diameter of about 250 microns and a length of about 5000 microns, were coated with iridium by sputtering in a conventional manner. The coating was about one micron thick and covered most of each filament but did leave some portions exposed.

Commercially available alumina powder having an average particle size of about 1 micron was used. The powder was packed around two of the coated filaments totally enveloping each filament, which were spaced about one centimeter from each other, in a die press and pressed at room temperature to form a compact about 31 mm × 7 mm × 5 mm in size.

The compact was wrapped with a thin platinum foil and inserted in a silica glass tube with a hole which was about the same size as that of the compact. The tube was evacuated and baked in vacuum of about $10^{-6}$ torr at 250° C for several hours. The silica glass tube was then sealed in about the same vacuum.

The sealed structure was then hot isostatically pressed in a gaseous atmosphere of argon at a pressure of 10,000 psi at a temperature of about 1550° C for about 30 minutes. The sample was then furnace cooled to room temperature and the pressure reduced to about atmospheric pressure.

The glass envelope was broken to recover the sample. The sample was cut to produce two composites, each about 1.5 × 0.3 × 0.3 cm, and each containing a coated filament therewithin. None of the coated filaments were exposed.

Both composites were heated in argon at about atmospheric pressure to 1650° C with one composite being maintained at such temperature for 24 hours and the other for 90 hours.

Both composites were then cut and their cross section polished. The cross section of the composite exposed for 24 hours is illustrated in FIG. 1A which shows that there was no significant loss of the iridium which initially had been deposited.

Figure 1A:
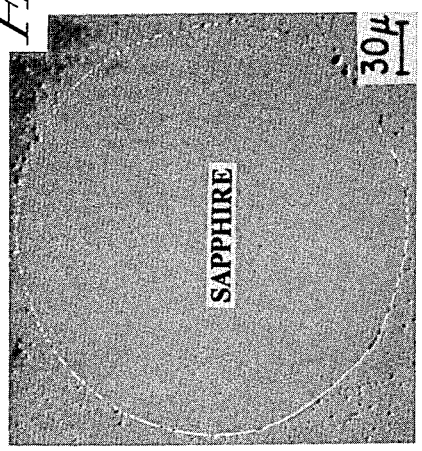
FIG. 1A shows the polished cross-section of one embodiment of the present composite containing a sapphire filament coated with iridium about one micron thick after the composite had been exposed to argon at 1650° C for 24 hours.

FIG. 1B is a magnified portion of FIG. 1A showing that the iridium coating blocked contact between the filament and alumina matrix and that there was no significant reaction between the iridium and the filament or matrix.

Examination of the sample exposed for 90 hours showed no significant difference from the one exposed for 24 hours.

Examination of the polished cross sections of both composites showed that they were essentially pore free.

EXAMPLE 2

This example was carried out in substantially the same manner as disclosed in Example 1 except that the coating of iridium was about 3 microns thick and left no significant portion of the sapphire filaments exposed.

One of the resulting composites was subjected to argon at about atmospheric pressure at a temperature of 1650° C for 24 hours.

The composite was then cut and its cross section polished. The cross section is shown in FIG. 2A. FIG. 2A shows that there is no direct contact between the filament and the matrix. That portion of the iridium coating in FIG. 2A that appears to be disconnected was found, on close examination, to have been pulled out by the mechanical polishing.

Figure 2B:
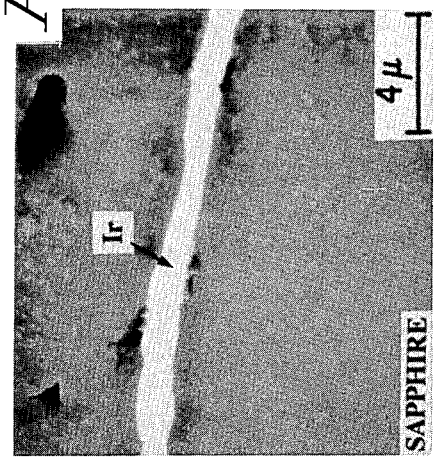
FIG. 2B shows a magnified portion of FIG. 2A.
Figure 2A:
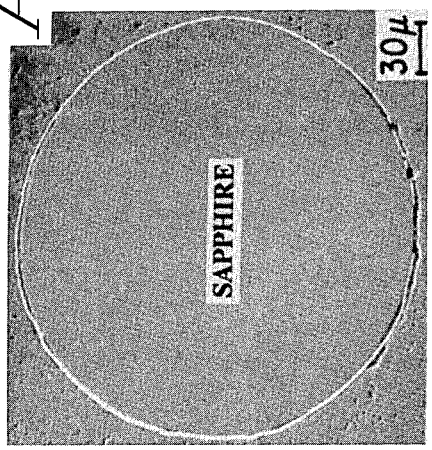
FIG. 2A shows the polished cross-section of another embodiment of the present composite containing a sapphire filament coated with iridium about three microns thick after the composite had been exposed to argon at 1650° C for 24 hours.

FIG. 2B is a magnified portion of FIG. 2A. It showed that the iridium coating was stable and blocked contact between the filament and matrix and that there was no significant reaction between the iridium and the filament or matrix.

Examination of the cross section of the composite showed that it was essentially pore free.

EXAMPLE 3

A composite was produced substantially in the same manner as disclosed in Example 2.

It was heated in oxygen at about atmospheric pressure to 1650° C and maintained at such temperature for 66 hours.

The composite was then cut and its cross section polished. The cross section showed that the coating of iridium blocked contact between the filament and matrix and that there was no significant reaction between the iridium and the filament or matrix.

EXAMPLE 4

This is a paper example.

A plurality of continuous sapphire filaments, each having a diameter of about 200 microns, are used. Each filament is coated with platinum by sputtering leaving none of the filament exposed.

The coated filaments are combined with sinterable alumina powder to form a compact wherein the coated filaments are spaced from each other and wherein none of the coated filaments are exposed.

The compact is sintered in an atmosphere of argon at about atmospheric pressure at about 1550° C for about two hours.

The resulting composite is then hot isostatically pressed as disclosed in Example 1. It has a porosity of less than about 10% by volume of the composite.

The coated filaments comprise at least about 10% by volume of the solid portion of the composite.

The ceramic matrix comprises at least about 30% by volume of the solid portion of the composite.

The platinum coating bars contact between the filaments and the matrix.

The composite is useful as a wear resistant part or as a high temperature structural material part.

What is claimed is:

1. A composite comprised of coated ceramic oxide fibrous material and ceramic oxide matrix, said fibrous material and oxide matrix having a melting point or a softening point above 1100° C, said fibrous material being coated with a noble metal selected from the group consisting of platinum, iridium, rhodium, ruthenium and any combinations or alloys thereof, said composite having a porosity of less than about 30% by volume of the composite, said coated fibrous material comprising at least about 10% by volume of the solid portion of said composite, said oxide matrix comprising at least about 30% by volume of the solid portion of said composite.

2. The composite according to claim 1, wherein said fibrous material and said oxide matrix have a melting point or a softening point above 1500° C.

3. The composite according to claim 1, wherein said matrix is amorphous.

4. The composite according to claim 1, wherein said matrix is polycrystalline.

5. The composite according to claim 1, wherein said fibrous material is alumina.

6. The composite according to claim 1, having a porosity of less than about 10%.

7. A composite comprised of coated oxide fibrous material and polycrystalline oxide matrix, said oxide fibrous material being selected from the group consisting of alumina, mullite, zircon, yttrium oxide, beryllium oxide, calcia stabilized zirconia, yttria stabilized zirconia, and any combinations thereof, said fibrous material being coated with a noble metal selected from the group consisting of platinum, iridium, rhodium, ruthenium and any combinations or alloys thereof, said coating of noble metal blocking significant contact between said fibrous material and said oxide matrix, said oxide matrix being selected from the group consisting of alumina, calcium aluminate, mullite, zircon, yttrium oxide, beryllium oxide, yttria stabilized zirconia, calcia stabilized zirconia, and any combinations thereof, said composite having a porosity of less than about 30% by volume of the composite, said coated fibrous material comprising at least about 10% by volume of the solid portion of said composite, said oxide matrix comprising at least about 30% by volume of the solid portion of said composite.

8. The composite according to claim 7, wherein said fibrous material is alumina and said matrix is alumina.

9. The composite according to claim 7, wherein said coated fibrous material is in the form of a plurality of coated continuous filaments spaced from each other.

10. The composite according to claim 7, having a porosity of less than about 10% by volume of the composite.

11. The composite according to claim 7, wherein said noble metal is platinum.

12. The composite according to claim 7, wherein said noble metal is iridium.

13. A composite comprised of a plurality of coated alumina filaments in a polycrystalline alumina matrix, said filaments being coated with a noble metal selected from the group consisting of platinum, iridium, rhodium, ruthenium and any combinations or alloys thereof, said coating of noble metal blocking significant contact between said filaments and said matrix, said composite having a porosity of less than about 10% by volume of the composite, said coated filaments comprising at least about 20% by volume of the solid portion of said composite, said oxide matrix comprising at least about 30% by volume of the solid portion of said composite.

14. A composite comprised of coated ceramic oxide fibrous material and ceramic oxide matrix, said fibrous material being selected from the group consisting of alumina, yttrium oxide, and any combinations thereof, said fibrous material being coated with a noble metal selected from the group consisting of platinum, iridium, and any combinations or alloys thereof, said matrix being selected from the group consisting of alumina, yttrium oxide, and any combinations thereof, said composite having a porosity of less than about 30% by volume of the composite, said coated fibrous material comprising at least about 10% by volume of the solid portion of said composite, said oxide matrix comprising at least about 30% by volume of the solid portion of said composite.

* * * * *